No. 855,333. PATENTED MAY 28, 1907.
C. A. McINTOSH.
CARRIER.
APPLICATION FILED JULY 18, 1906.
3 SHEETS—SHEET 2.
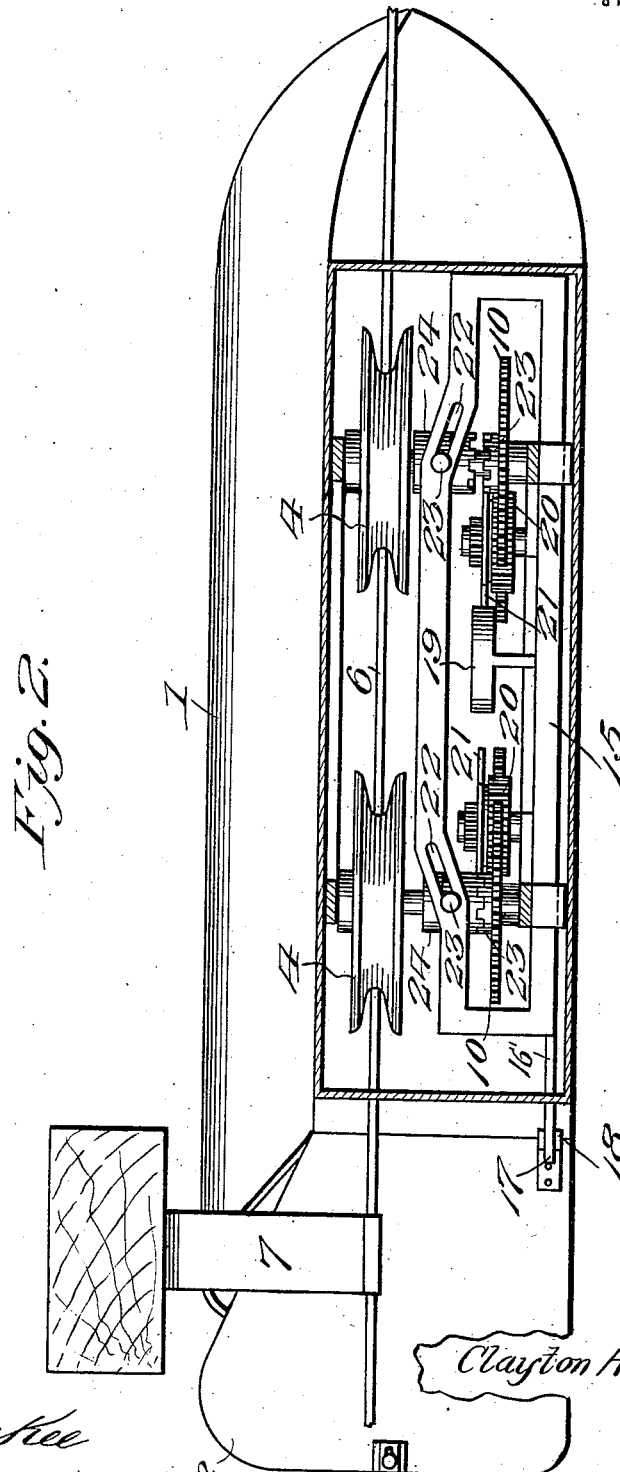
Witnesses
E. G. McKee
K. Allen
Inventor
Clayton A. McIntosh
By Victor J. Evans, Attorney No. 855,333.
PATENTED MAY 28, 1907.
C. A. McINTOSH.
CARRIER.
APPLICATION FILED JULY 18, 1906.
3 SHEETS—SHEET 3.
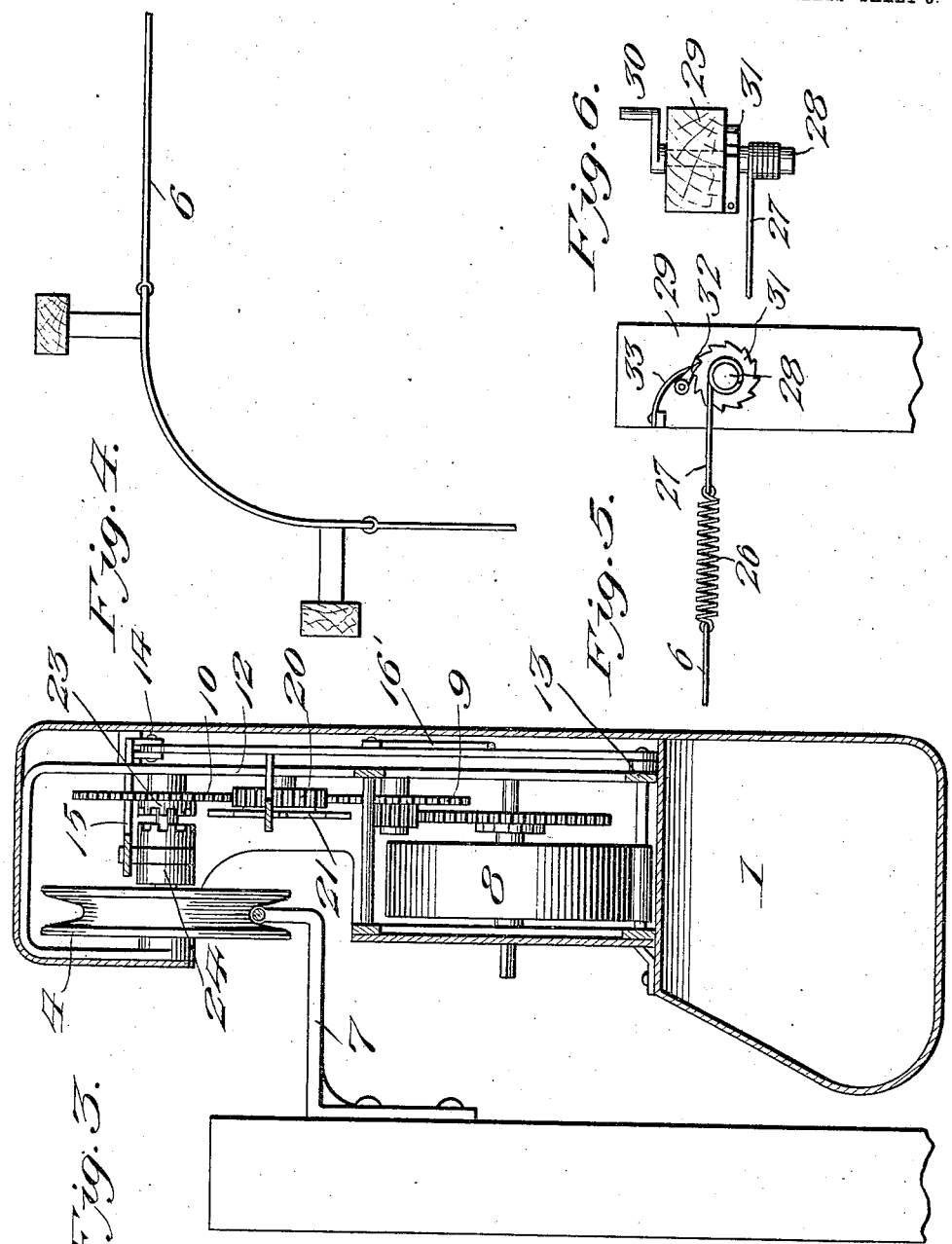
Witnesses
E. G. McKee
H. Allen
Inventor
Clayton A. McIntosh
By Victor J. Evans
Attorney

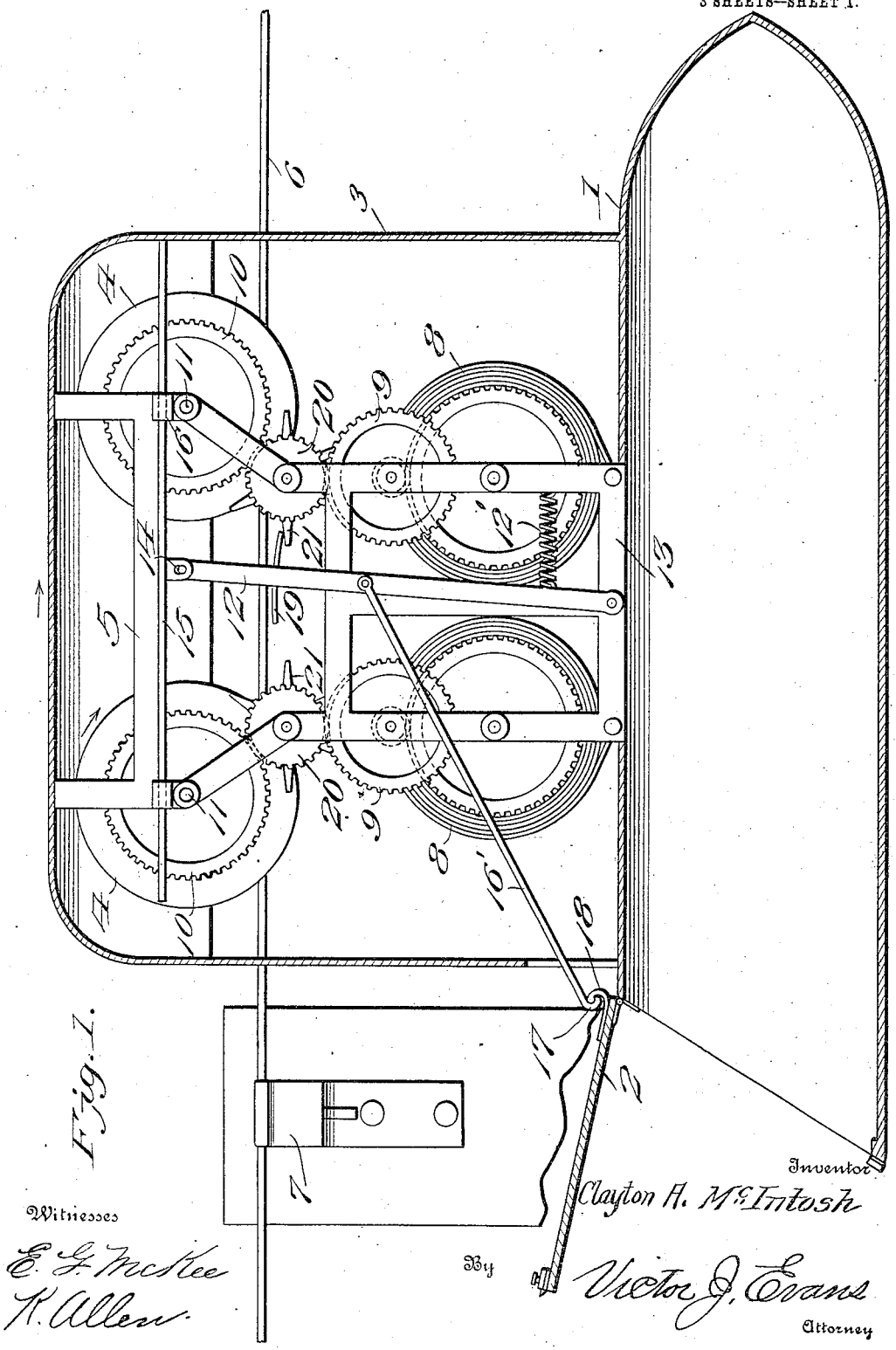

UNITED STATES PATENT OFFICE.

CLAYTON A. McINTOSH, OF WASHINGTON, KANSAS, ASSIGNOR TO BARTON S. WILSON, OF WASHINGTON, KANSAS.

CARRIER.

No. 855,333.                Specification of Letters Patent.            Patented May 28, 1907.

Application filed July 18, 1906. Serial No. 326,754.

*To all whom it may concern:*

Be it known that I, CLAYTON A. McINTOSH, a citizen of the United States, residing at Washington, in the county of Washington and State of Kansas, have invented new and useful Improvements in Carriers, of which the following is a specification.

This invention relates to that class of carriers in which a receptacle is arranged and adapted to travel on a wire and propelled by a suitable motor.

In carrying out the invention a receptacle for transporting articles from one point to another is provided having grooved wheels adapted to travel on a wire and a pair of motors with a mechanism for alternately locking one of said motors and permitting the forward trolley wheel to travel independently of its motor, while the rear motor is in action.

Referring to the accompanying drawings, in which similar figures of reference indicate like parts: Figure 1 is a side view in elevation and vertical section, showing a motor carrier constructed in accordance with this invention. Fig. 2 is a plan view thereof in horizontal section, showing one of the grooved pulleys detached from its motor mechanism. Fig. 3 is an end view in vertical section showing one of the pulleys detached from its motor mechanism. Fig. 4 is a plan view of a porton of the track over which the carrier is moved. Fig. 5 is a detail view, showing a spring actuated pawl and ratchet device for tightening the wire or track; and Fig. 6 is a detail plan view of the device shown in Fig. 5.

In carrying out the invention, a suitable receptacle 1 is provided which may be made of thin metal or other suitable material and has at one end a hinged door 2. The receptacle 1 is provided with a housing 3 in which is inclosed the two grooved wheels 4 mounted in a suitable frame 5 suspended from the housing 3, said wheels 4 being mounted on a wire 6 which is supported at suitable intervals in brackets 7. Each grooved wheel 4 is provided with a suitable motor mechanism for propelling the carrier and as here shown consisting of a coiled spring 8 connected by a train of gearing 9 with a toothed gear 10 mounted on the shaft 11 of each grooved wheel 4.

As it is only desired that one motor shall operate in the movements of the carrier a mechanism is provided by means of which, when the one motor mechanism is in action, the other will be locked and thrown out of gear with and held from moving its grooved wheel 4. This is preferably accomplished by means of a vertical rod 12 pivoted at its lower end to the frame 13 bearing the two spring mechanisms, the upper end of the rod 12 which latter is controlled by a spring 12' being connected by a pivoted joint 14 with a horizontal, reciprocating frame 15 movable endwise in suitable bearings 16 on the frame 5. The rod 12 is connected by a rod 16' pivoted at one end to the rod 12 and having its other hook-shaped end 17 engaging the hook 18 in the top of the door 2.

Adjacent to the upper end of the rod 12 is a cross piece 19 and in the train of gearing 9 is located the gear wheel 20 which has projecting arms 21 by means of which, when one end of the cross piece 19 is brought by the movement of the rod 12 into the path of the projections 21, it will interlock with and hold the gear wheel 20 from turning and thereby lock the whole train of gear 9. This locking of the motor mechanism may be accomplished by the swinging of the arm 12 so that when the arm 12 is in the position shown in Fig. 1 one set of the motor mechanism is locked and the other set free to drive its grooved wheel. Now upon closing the door 2 the rod 16' draws the rod 12 over and brings the adjacent projection of the cross piece 19 to locking position with one of the projections 21 of the other gear wheel 20, thereby locking its train of gear mechanism 9, the other train of gear mechanism being released and free to operate its grooved wheel 4. At the same time that these movements take place the grooved wheel which is operated by the motor mechanism is thrown into locking engagement therewith by means of a diagonal slot 22 on the sliding bar 15, through which projects a pin 23 mounted on a clutch 24 movable laterally on the shaft 11 of the grooved wheel into and out of engagement with the clutch 25 mounted on the toothed wheel 10.

The track wire 6 is, as seen in Figs. 5 and 6, engaged at one of its ends with an expanded tensioning spring 26, in turn engaged with a flexible connection or strap 27 connected to be wound upon a drum 28 journaled in an end post or support 29 and equipped with an operating crank 30, there being fixed on the drum shaft a toothed ratchet 31 engaged by a spring actuated pawl 32 pivoted to the post for holding the drum against rotation and pressed to engaging position under the action of a spring 33. It is apparent that in action the spring 26 will hold the wire 6 yieldably under tension, and further that when circumstances require this tension may be increased or the slack taken up in the wire 6 by operating the drum 28 through the medium of the crank 30 to wind the connection 27 and further that the tension may be decreased by releasing the pawl from engagement with the ratchet for permitting the connection 27 to unwind. While I have shown the connection at only one end of the track wire, it will be understood that in practice both ends of the wire will be equipped with the tensioning devices.

From the foregoing description, when the carrier is moved in one direction the forward grooved wheel is out of gear with its motor mechanism and serves as a guide pulley, said motor mechanism being locked, as set forth, and the motor mechanism of the other grooved wheel being unlocked and operating the rear grooved wheel.

By means of this invention a double motor carrier conveying parcels from one point to another is provided which may be utilized either for postal, store or other service.

Having described my invention, what I claim is:

1. A parcel carrier comprising a receptacle having a movable door, a mechanism for moving said carrier consisting of two grooved wheels each having a motor mechanism consisting of a spring actuated train of gearing, and a mechanism connected with the door of the receptacle and with a clutch mechanism in each motor mechanism, whereby each motor mechanism is alternately locked and released and each grooved wheel is thrown into and out of engagement with the motor mechanism, as herein set forth.

2. A parcel carrier consisting of a frame supporting a receptacle and having two grooved wheels mounted on a wire or track, each grooved wheel connected by a train of gearing to a spring actuating device, each grooved wheel being normally held in clutch engagement with the train of gearing, the latter being provided with a stop device for locking said gearing, in combination with a mechanism for alternately locking and unlocking and releasing the grooved pulley and its operating mechanism.

3. A parcel carrier consisting of a receptacle having a hinged door and a double motor mechanism in combination with grooved wheels mounted on the wire or track, said grooved wheels being alternately held in clutch engagement with a train of gearing, and means for alternately locking one of the trains of gearing and releasing the other and also throwing one grooved wheel into engagement with its motor mechanism and releasing the other from its motor mechanism consisting of a reciprocating frame connected by a vibrating bar which is in turn connected by a rod with the hinged door whereby said shifting of the grooved wheels into locking engagement with their motor mechanisms is controlled by the movements of the door.

In testimony whereof, I affix my signature in presence of two witnesses.

CLAYTON A. McINTOSH.

Witnesses:
JAMES E. ARNETT,
FREDERIC W. STACKPOLE